UNITED STATES PATENT OFFICE.

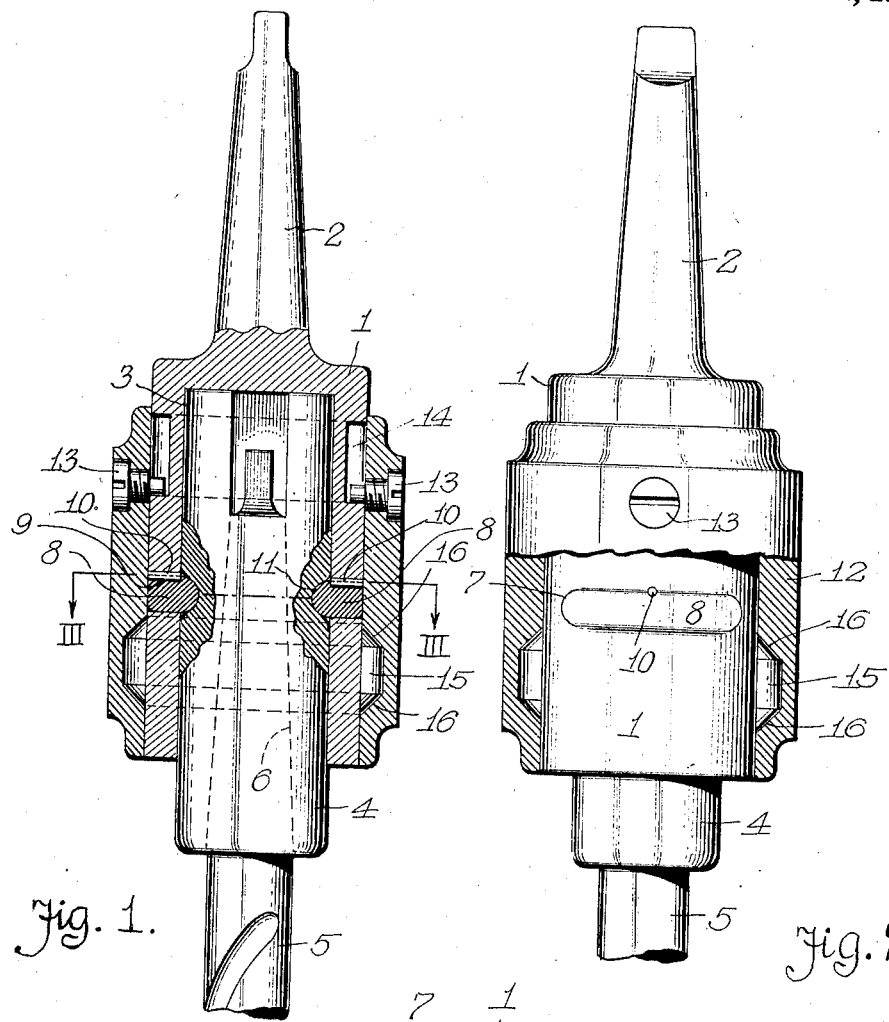

THOMAS J. HINES, OF DETROIT, MICHIGAN.

DRILL-CHUCK.

1,372,289.  Specification of Letters Patent.   Patented Mar. 22, 1921.

Application filed January 17, 1919. Serial No. 271,598.

*To all whom it may concern:*

Be it known that I, THOMAS J. HINES, a citizen of the United States of America, residing at Detroit, in the county of Wayne and State of Michigan, have invented certain new and useful Improvements in Drill-Chucks, of which the following is a specification, reference being had therein to the accompanying drawings.

This invention relates to a drill chuck and my invention aims to provide novel means, in a manner hereinafter set forth, for holding a drill socket, spindle or other member in the chuck, so that it may be easily and quickly removed even while the chuck is revolving, thereby obviating the necessity of stopping the machine in order to change drills or other tools operatively supported from the chuck.

Another object of my invention is to provide a drill chuck with positive and reliable locking members held in a distended and locked position by a reciprocable sleeve, which in one position permits of the members being released. The members and the sleeve are constructed so that said members may be readily shifted to retracted or distended positions and in this manner the changing of drill sockets or other members in the chuck may be expeditiously accomplished.

Another object of my invention is to provide a simple, durable and inexpensive chuck that will accommodate, without material modification the present type of drill sockets or adapters used in connection with chucks, consequently it is possible for a manufacturer to install my improved chucks without discarding drill sockets that may already be in use.

The above and other objects are attained by a mechanical construction that will be hereinafter specifically described and claimed, and reference will now be had to the drawing wherein—

Figure 1 is a vertical sectional view of a chuck in accordance with my invention;

Fig. 2 is a side elevation of the same, partly broken away, and

Fig. 3 is a horizontal sectional view taken on the line III—III of Fig. 1.

The chuck comprises a cylindrical body 1 having the upper end thereof with a tang or attaching member 2 so that the drill chuck may be operatively connected to a suitable machine (not shown).

The chuck body 1 has a longitudinal bore or recess 3 with the lower end thereof open so as to receive a cylindrical drill socket or a drill holding member 4, said drill socket having its upper end abutting the body 1 so that said body may receive any end thrust produced by a drill or other tool body 5 which has a tang or upper end 6 detachably mounted in the member 4.

Diametrically opposed walls of the chuck body 1 have lateral segment shaped slots 7 with rounded ends, as best shown in Fig. 2, to receive slidable chuck or gripping members 8, said members being segment shaped in plan with the outer arc walls thereof conforming in curvature to the periphery of the chuck body 1, so that when said chuck members are in a retracted or locked position the outer walls of the chuck members will be flush with the periphery of the chuck body. The chuck members are capable of sliding in a radial direction relative to the axis of the chuck body and to prevent lateral displacement of said members the upper faces thereof are provided with grooves 9 to receive pins 10 that also engage in the chuck body, but do not interfere with a radial movement of said chuck members.

The inner edges of the clutch members 8 are rounded or semi-cylindrical and are adapted to engage in similarly shaped grooves 11 provided therefor in diametrically opposed walls of the drill socket 4, as shown in Fig. 1, and thus lock the drill socket in the chuck body so that the drill socket may be driven in synchronism with the chuck.

Slidable on the chuck body 1 is the sleeve or reciprocable member 12 having one end thereof provided with opposed screws 13 with the reduced ends of said screws extending into longitudinal slots or grooves 14 in the upper end of the chuck body 1, said set screws serving as stop pins in conjunction with the end walls of the grooves 14 to limit the movement of the sleeve 12 on the chuck body. At the lower end of the sleeve the inner wall thereof has an annular channel 15 with upper and lower beveled walls 16, said channel being adapted to receive the outer curved edges of the chuck members 8, when said channel is placed in registration with the slots 7 by shifting the sleeve 12 upwardly on the chuck body. With the sleeve in such a position which is defined by the stops of the sleeve, the drill socket 4 can be pulled outwardly and thus shift the chuck members 8 to a distended position in the slot 7, said chuck members extending into the channel 15 and providing sufficient clearance for the withdrawal of the drill socket 4 from the chuck body.

The same or another drill socket can be inserted in the chuck body and by restoring the sleeve 12 to normal lowered position, the upper beveled walls 16, of the channel 15 ride against the outer edges of the chuck members 8 and force said chuck members inwardly to engage in the grooves 11 of the drill socket 4 and thereby establish a driving relation between the drill socket and the chuck body, without any danger of the drill socket becoming accidentally displaced. On account of the lateral slots 7 intersecting the bore 3 of the chuck body 1, the inner edges of the chuck members 8 may engage the rounded end walls of the slots 7 and with the chuck members extending into the grooves 11 of the socket 4 there is a positive driving relation between the drill socket and the chuck body.

If drill sockets have been previously used with small ball clutch recesses, it is only necessary for a machinist to enlarge such small sockets or recesses to receive my chuck members, and this will obviate the necessity of discarding drill sockets that may already be in use.

One embodiment of my invention has been illustrated, but it is to be understood that the structural elements are susceptible to such variations and modifications as fall within the scope of the appended claim.

What I claim is:—

A chuck comprising a body, a detachable socket therein, chuck members in said chuck body adapted to extend into said socket, co-operating radial grooves in the chuck body and chuck members, and pins extending longitudinally of the grooves forming guides to assure radial movement and prevent circumferential movement of said chuck members, a sleeve slidable on said chuck body and adapted to retain said chuck members in engagement with said socket, and means carried by said sleeve and engaging said chuck body to limit the movement thereof.

In testimony whereof I affix my signature in the presence of two witnesses.

THOMAS J. HINES.

Witnesses:
KARL H. BUTLER,
ANNA M. DORR.